United States Patent [19]
Riffe

[11] 3,903,752
[45] Sept. 9, 1975

[54] RECIPROCATING MACHINE

[75] Inventor: Delmar R. Riffe, Murrysville, Pa.

[73] Assignee: White-Westinghouse Corporation, Cleveland, Ohio

[22] Filed: Nov. 29, 1973

[21] Appl. No.: 420,334

[52] U.S. Cl. .......................... 74/579 E; 123/193 C
[51] Int. Cl. .............................................. G05g 1/00
[58] Field of Search .................................. 74/579 E; 123/193 C, 193 CP, 123/198 E, 195 C; 92/128

[56] References Cited
UNITED STATES PATENTS

| | | | |
|---|---|---|---|
| 1,680,917 | 8/1928 | Sloan et al. | 74/579 E |
| 3,301,237 | 1/1967 | Wolf | 123/193 C |
| 3,695,240 | 10/1972 | Cookson | 123/193 C |

*Primary Examiner*—Samuel Scott
*Assistant Examiner*—Wesley S. Ratliff, Jr.
*Attorney, Agent, or Firm*—McNenny, Farrington, Pearne & Gordon

[57] ABSTRACT

A reciprocating machine having a cylinder, a piston in the cylinder, a crankshaft or crankpin and a connecting rod connecting the crankshaft or crankpin to the piston. The connecting rod has a bearing surface for receiving the crankshaft or crankpin and a wrist pin portion for insertion into an opening in the piston. The cylinder has a downwardly open slot in a side wall providing access to the wrist pin opening in the piston when the piston is at a substantially bottom dead center position. In assembling the machine the connecting rod can be moved linearly to position the bearing surface of the connecting rod on the crankshaft or crankpin and insert the wrist pin portion of the connecting rod into the opening in the piston simultaneously.

6 Claims, 5 Drawing Figures

RECIPROCATING MACHINE

BACKGROUND OF THE INVENTION

1. Field of the Invention:

This invention pertains to the art of reciprocating machines, and more particularly to reciprocating compressors of the type used in the cooling unit of a refrigerator or an air-conditioning system.

2. Description of the Prior Art:

A determining factor in the construction of reciprocating motor-compressors such as those used in refrigerators, freezers and air-conditioning equipment has been the method chosen for assembling the crankshaft or crankpin with the connecting rod and the connecting rod with the piston. One method has been to make the crank end of the connecting rod a sleeve for encircling the crankpin. The sleeve is split in half and means are provided, usually bolts, for assembly and disassembly of the halves of the sleeve onto the crankpin. The split allows the connecting rod to be attached to the crankpin of the main shaft subsequent to the main shaft being installed in its frame and subsequent to the installation of the piston into the cylinder of the machine. This approach permits the use of a one piece frame utilizing a generally centrally located journal bearing on the main shaft. This bearing is located between the motor rotor and the crankpin shaft. However, manufacture of the connecting rod split sleeve is a difficult and costly process, in that the two pieces are die cast or formed in some manner to greater than finish dimensions. The mating surfaces of each piece is finish machined and the pieces are bolted together for final machining of the bore. This process results in the halves of the sleeve becoming a matched pair requiring that they remain associated with each other throughout the manufacturing and assembly process. The special handling required to ensure this association is costly.

A second method of assembly is to design a two part frame. One-half of the frame contains the cylinder and one of two main shaft bearings. The second half of the frame contains the second main shaft bearing. Initially the motor stator is fixed to one of the half frames and the shaft and rotor are supported in the other. The piston and connecting rod are a subassembly and the crank end of the connecting rod is a ring. As the two halves of the frame are assembled, subsequent to the piston connecting rod assembly being inserted in the cylinder the connecting rod ring is slid over the end of the crankpin at the end of the main shaft. This approach avoids the costly machining and handling of the split connecting rod sleeve but incurs the cost of additional parts such as bearings, two frames, connecting means, and the handling problems associated therewith.

The present invention permits the use of a one piece frame structure and provides means for assembling the connecting rod to the crankpin and the piston which eliminates the disadvantages pointed out above in the prior art assemblies.

The prior art, of which the applicant is aware is illustrated by U.S. Pat. No. 1,890,914; and British Pat. No. 153,685. Each of these references shows an opening through a cylinder wall for insertion of a wrist pin which is separate from the connecting rod; however, neither of the references show or teach an opening through a cylinder wall, through which opening a wrist pin which is permanently attached to a connecting rod may be inserted into a piston.

SUMMARY OF THE INVENTION

An improved construction for a reciprocating machine having a cylinder, a piston in the cylinder, a unitary connecting rod — wrist pin, and a shaft having a crankpin thereon. The cylinder has a downwardly open slot in a side wall which provides access to the piston when the piston is housed in the cylinder in a substantially bottom dead center position. In assembling the machine the wrist pin portion of the connecting rod passes through the open slot in the cylinder and engages a wrist pin opening in the piston and a bearing portion of the connecting rod simultaneously engages the crankpin.

DESCRIPTION OF THE PREFERRED EMBODIMENTS

Figure 2:
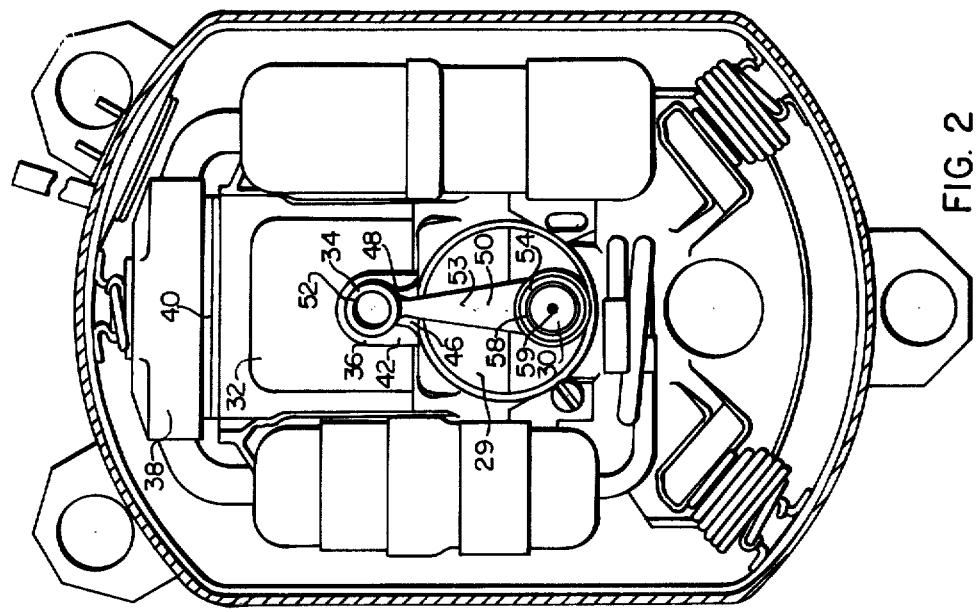
FIG. 2 is a view taken along line II—II of FIG. 1.

Throughout the description which follows like reference characters refer to like elements in all Figs. of the drawings.

Figure 1:
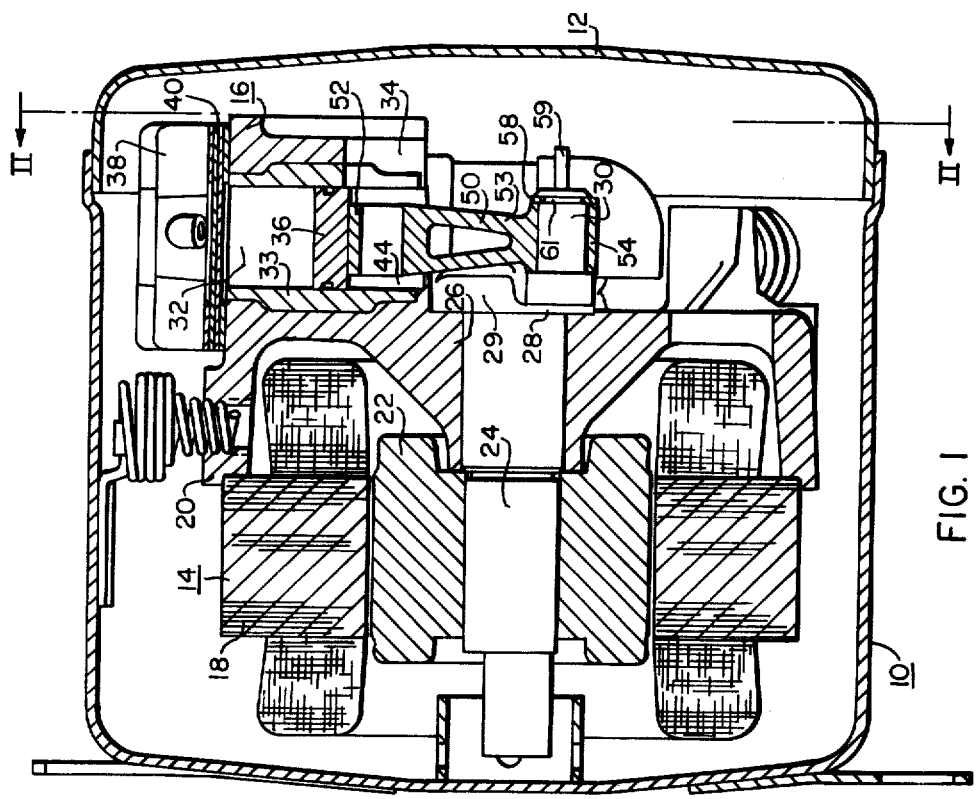
FIG. 1 is a sectional view of a reciprocating motor-compressor unit embodying the teachings of this invention.

Referring to FIG. 1, the invention is illustrated as embodied in a motor-compressor unit 10 comprising a hermetically sealed shell 12 housing an electric motor 14 and a reciprocating compressor 16. The electric motor 14 drives the reciprocating compressor 16.

As can be seen in FIG. 1, the motor 14 includes a stator 18 which is bolted into a recess in a frame 20 and a rotor 22 mounted on a main drive shaft 24 subsequent to the shaft 24 being inserted through a main journal bearing 26 in the frame 20. Mounting of the rotor 22 on the shaft 24 prevents the shaft from being separated from the frame because movement of the shaft 24 to the right in FIG. 1 is prevented by interference of the rotor 22 with the frame 20 and movement to the left is prevented by the interference of a shoulder 28 on the main shaft 24 with the frame 20. The shoulder 28 serves as a thrust bearing and can also contain a counterweight 29. The crankpin 30 extends from the shoulder 28.

As is common practice in the art, the main shaft 24 in FIG. 1 serves as the transmission between the motor 14 and the compressor 16. The crankpin 30 is connected to a piston 36 of a compressor 16 by means of a connecting rod 50. The compressor 16 comprises a cylinder 32 made integral with the frame 20. In the embodiment shown a cast iron sleeve 33 is cast into the frame 20 permitting the cylinder 32 to be a different material than the frame. The axial centerline of the cylinder 32 runs through the center of rotation of the crankpin 30 and is perpendicular thereto. The upper end of the cylinder is closed by a cylinder head 38. The input and output valving 40 is located between the head 38 and the cylinder 32.

The present invention presents a new way of connecting the crankpin 30 to the piston 36 during the assembly of the compressor 10. This new way of making the connection between the crankpin 30 and the piston 36, comprises providing a downwardly open slot 34, FIGS. 1 and 2, in a side wall of the compressor cylinder 32. The slot 34 is symmetric about the axial centerline of the cylinder 32. The piston 36 is inserted into the cylinder 32 either through the bottom or top opening prior to the installation of a cylinder head 38 and the installation of the valving 40. The piston 36 is preferably made from a solid piece of aluminum alloy and includes a depending wall or skirt 42 having a diametric opening 44 transversely therethrough from one wall face to the opposite wall face. The lower part of the opening 44 opens into a slot 46. The width of the intersection 48 between the opening 44 and the slot is less than the diameter of the opening 44.

Referring again to FIGS. 1 and 2, the connecting rod 50 is a unitary connecting rod having a wrist pin portion 52, a bearing portion 54 for receiving the crankpin 30, and a leg portion 53 connected between the wrist pin portion 52 and the bearing portion 54.

In assembling the compressor 10, the piston 36 is inserted into the cylinder 32 substantially in the bottom dead center position of the piston 36 in the cylinder 32, with the opening 44 in the piston 36 positioned in registry with the downwardly open slot 34 in the sidewall of cylinder 32. The wrist pin portion 52 of the connecting rod 50 is slid through the slot 34 in the wall of the cylinder 32 to position the wrist pin portion 52 in the opening 44 in the piston 36 simultaneously with the positioning of bearing sleeve 54 onto the crankpin 30 positioning also in a substantially bottom dead center position. The bearing sleeve 54 is tubular and provides a journal bearing surface which completely encircles the crankpin 30. Thus, the bearing sleeve 54 forms an unbroken, closed loop. The wrist pin portion 52 is free to pivot in the opening 44 in the piston 36. Reciprocating motion is transmitted to the piston 36, by the crankpin 30 and the connecting rod 50 as the motor 14 rotates the shaft 24.

Figure 3:
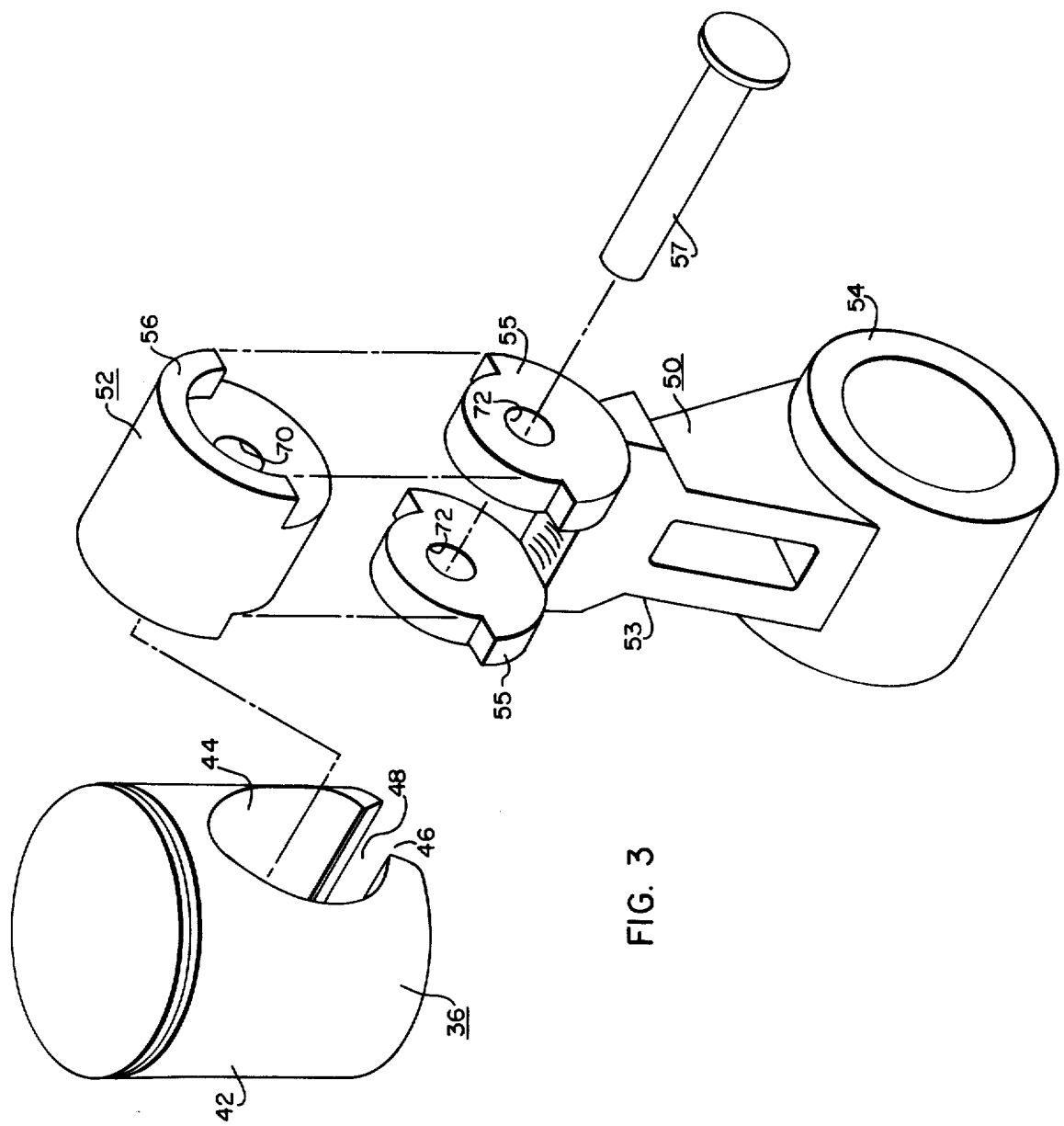
FIG. 3 is an exploded isometric view, of a piston and connecting rod subassembly used in the compressor of FIG. 2.

FIG. 3 illustrates another embodiment of a connecting rod 50 for use in this invention. In the embodiment shown in FIG. 3, the wrist pin portion of the connecting rod 50 is provided so that it may be replaced if it becomes so worn that it is no longer satisfactory. In the structure shown in FIG. 3 the wrist pin 52 comprises a removable member 56 constructed from a hardened material, such as sintered iron or steel, to provide a durable wearing surface for the portion 56 of the wrist pin 52. The wrist pin end of the connecting rod 50 is provided with a pair of identical, spaced, bracket members 55. The wrist pin portion 56 has a central opening 70 therethrough. Each of the brackets 55 has an opening 72. The openings 72 in the brackets 55 are aligned with each other. The wrist pin portion 56 is placed between the two brackets 55, with opening 70 in the wrist pin portion aligned with the openings 72 in the brackets 55 and a pin 57 is inserted into the openings 70 and 72 to attach the bearing portion 56 of the wrist pin 52 to the connecting rod 50. The dimension of the wrist pin bearing portion 56 is such that the bearing portion 56 will slide into the opening 44 in the piston 36 with a close tolerance, or snug fit.

Additional details of this and other constructions of unitary connecting rod — wrist pin assemblies are disclosed in copending Earley — Riffe U.S. patent application Ser. No. 420,333 (W. E. Case 44,659) filed simultaneously herewith, and to which reference should be had.

After the connecting rod 50 has been positioned with the bearing portion 50 on the crankpin 30 and the wrist pin portion 52 inside the opening 44 in the piston 36, the connecting rod 50 is secured in this position by a snap ring 58 which is retained in a machined groove 61 on the crankpin 30, as shown in FIG. 2.

In addition to the reduced cost and ease of assembly, the invention enhances lubrication of the system. Traditionally in this type of unit the oil is pumped through a hole in the mainshaft and crankpin which at some point of rotation is in communication with an axial hole in the connecting rod through which the oil passes to lubricate the wrist pin. However, as shown in FIG. 2 in the present invention the bearing surfaces between the wrist pin portion 52 of the connecting rod 50 and the piston opening 44 are exposed to the environment exterior of the cylinder 32 through the slot 34 in the side wall of the cylinder 32 when the piston 36 is in its bottom dead center position. A lower portion of the wrist pin portion 52 is exposed through the bottom of the cylinder at all piston positions. This arrangement improves the bearing life in that in the present arrangement the oil is pumped up through a generally axial hole in the mainshaft 24 and crankpin 30. The oil is then dispersed as an oil spray from a nozzle 59 at the end of the crankpin 30. The oil spray cools and lubricates the compressor. As some of the oil settles in the slot 34 in the cylinder 32 and in the slot 46 in the piston 36 the reciprocation of the piston 36 helps the oil to work its way into the cylinder 32 and onto the bearing surface between the wrist pin portion 52 and the piston opening 44. Because this arrangement provides a continuous and copious supply of oil to these surfaces their wear rate is reduced.

Figure 4:
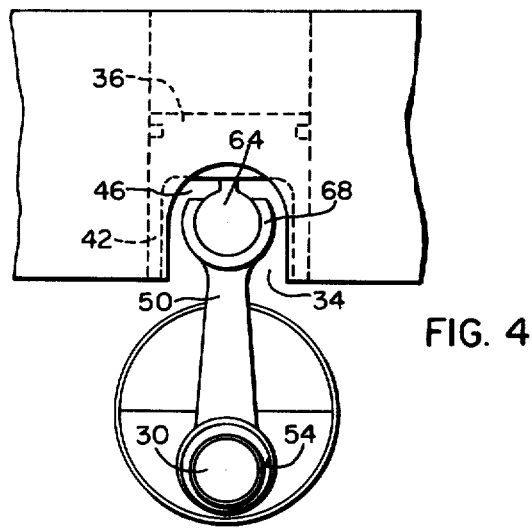
FIG. 4 is a fragmentary elevational view of a connecting rod and piston showing an alternate construction.
Figure 5:
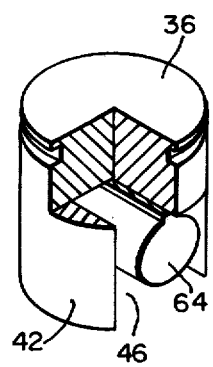
FIG. 5 is an isometric view, partially in section, of the piston shown in FIG. 4.

Another arrangement for attaching the connecting rod 50 to the piston 36 is illustrated in FIGS. 4 and 5. In this arrangement the piston 36 includes a downward depending wall 42 having a slot 46 therein which allows access to a pin 64 projecting from the bottom of the piston 36. The pin 64 is formed integral with the piston 36. The connecting rod 50 has a wrist pin socket portion 68, generally U-shaped, which receives and substantially encircles the pin 64 in a journal bearing relationship when the connecting rod 50 is properly installed to connect between the crankpin 30 and the piston 36. This installation is accomplished in substantially the same manner as the connecting rod 50 is installed in the previously described embodiments. That is, the connecting rod 50 is moved in a direction to position the bearing portion 54 onto the crankpin 30; and, at the same time move the wrist pin portion 68 through the opening 34 in the wall of the cylinder 32 so that the wrist pin portion 68 engages around the pin 64, which pin is integral with the piston 36. The wrist pin socket portion 68 engages the pin 64 with a tolerance which permits the wrist pin portion 68 to freely oscillate with respect to the pin 64.

From the foregoing description, taken with the drawings, it is seen that this invention has provided a new and improved apparatus for connecting a rotating crankpin or arm to a reciprocating piston in a reciprocating machine.

I claim:

1. In a reciprocating machine:
   a shaft adapted to be rotated;
   a crankpin attached to said shaft;
   a cylinder, said cylinder being closed at one end, said cylinder having a sidewall depending from the closed end, said depending sidewall having a downwardly-open opening therein throughout the thickness of the sidewall;
   a piston located in said cylinder, said piston being adapted for reciprocating movement in said cylinder, said piston having means for attaching said piston to a wrist pin, said piston being movable in said cylinder to position said means for attaching said piston to said wrist pin in alignment with said opening in said depending sidewall of said cylinder;
   a connecting rod for connecting said crankpin to said piston, said connecting rod having an unbroken, closed loop, cylindrical bearing portion positioned on said crankpin and a wrist pin portion for attaching to said means on said piston said wrist pin portion of said connecting rod being movable through said opening in said depending sidewall of said cylinder to engage said means for attaching said piston to said wrist pin simultaneously as said cylindrical bearing portion of said connecting rod is positioned on said crankpin.

2. The apparatus of claim 1 wherein:
   the means for attaching said piston to said wrist pin portion of said connecting rod comprises a substantially transverse opening through said piston, said opening receives the wrist pin portion of said connecting rod as the wrist pin portion of said connecting rod is inserted through said opening in said depending wall of said cylinder.

3. The apparatus of claim 2 wherein:
   said wrist pin portion of said connecting rod comprises a separate bearing member removably attached to said connecting rod.

4. The apparatus of claim 1 wherein:
   said means for attaching said piston to said wrist pin portion of said connecting rod comprises a pin integral with said piston, and said wrist pin portion of said connecting rod comprises a socket section for engaging said pin as said wrist pin portion of said connecting rod is inserted through said opening in said depending wall of said cylinder.

5. In a reciprocating machine:
   a unitary connecting rod - wrist pin having an unbroken, closed loop at the crank end, and a journal portion at the other end;
   a crankshaft including a projecting crankpin;
   a piston having a transverse bore open at at lease one side of the piston, and open at the bottom for at least the major part of the length of the bore, to receive the journal portion of said rod — wrist pin into the bore through the side of said piston;
   a cylinder for receiving said piston and having a wall provided with a downwardly-open slot throughout the thickness of the wall in a location thereon in registry with said journal portion of said rod — wrist pin when said piston is in a position at substantially bottom dead center;
   means for preventing said crank end loop from becoming disengaged from said crankpin;
   said foregoing parts thereby being adapted to permit assembly by inserting said pistion into the bottom end of said cylinder and aligning said bore with said slot; moving said rod — wrist pin into place by sliding said journal portion into said bore with said closed loop end being received on said crankpin in its substantially bottom dead center position, and applying said disengagement prevention means.

6. An improved reciprocating machine having an assembly of parts comprising a reciprocating piston housed within a cylinder, a rotatable crankshaft and means drivingly connecting said crankshaft to said piston wherein the improvement comprises:
   a slot extending through the thickness of the sidewall of said cylinder, said slot being open in the direction of said crankshaft;
   said means connecting said crankshaft to said piston comprising a connecting rod having on each end means for telescopic engagement of complementary engaging means on said crankshaft and said piston in direction transverse to the direction of reciprocation and wherein said slot and said complementary engaging means on said piston are aligned for passage of said rod through said slot in said transverse direction for simultaneous engagement of said rod with both said crankshaft and said piston; and, means for maintaining said parts in said assembled position.

* * * * *